United States Patent [19]

Lightbody et al.

[11] Patent Number: 5,471,577
[45] Date of Patent: Nov. 28, 1995

[54] DISPLAYING A SUBSAMPLED VIDEO IMAGE ON A COMPUTER DISPLAY

[75] Inventors: Timothy R. Lightbody, Northboro; Daniel F. Cutter, Boxboro; Brian M. Nowokunski, Leominster, all of Mass.

[73] Assignee: Data Translation, Inc., Marlboro, Mass.

[21] Appl. No.: 451,655

[22] Filed: May 30, 1995

Related U.S. Application Data

[63] Continuation of Ser. No. 49,100, Apr. 16, 1993, abandoned.

[51] Int. Cl.[6] .................................. G06F 3/14; G06T 1/20
[52] U.S. Cl. .................... 395/157; 395/154; 395/163; 395/164; 395/128; 348/552
[58] Field of Search ........................ 395/157, 154, 395/128, 139, 162–164; 348/552, 427, 458; 345/119, 131, 202

[56] References Cited

U.S. PATENT DOCUMENTS

| | | | |
|---|---|---|---|
| 4,970,663 | 11/1990 | Bedell et al. | 395/139 |
| 5,045,940 | 9/1991 | Peters et al. | 348/472 |
| 5,109,482 | 4/1992 | Bohrman | 395/154 |
| 5,191,645 | 3/1993 | Carlucci et al. | 395/139 X |
| 5,206,929 | 4/1993 | Langford et al. | 395/157 X |
| 5,257,348 | 10/1993 | Roskowski et al. | 395/157 |
| 5,276,437 | 1/1994 | Horvath et al. | 345/119 |
| 5,283,561 | 2/1994 | Lumelsky et al. | 395/154 X |
| 5,353,404 | 10/1994 | Abe et al. | 395/164 |
| 5,355,450 | 10/1994 | Garmon et al. | 395/162 |
| 5,402,147 | 3/1995 | Chen et al. | 395/154 X |
| 5,432,900 | 7/1995 | Rhodes et al. | 395/154 |

OTHER PUBLICATIONS

"Announcing a totally new concept in the field of video post production" distributed Jan. 1992, source: Data Translation, Marlboro, Mass.
News Release entitled "Media 100™—Industry's First Online, Nonlinear Video Production System Introduced by Data Translation's Multimedia Group" dated Jan. 11, 1992.
"Multimedia Group Strategy and Media 100™ Backgrounder" dated Feb. 1992.

*Primary Examiner*—Raymond J. Bayerl
*Attorney, Agent, or Firm*—Fish & Richardson

[57] ABSTRACT

Apparatus for displaying a reduced-size image in a window of the display of a host computer, the reduced-size image based upon subsampled digital image data. The apparatus includes a host computer and a peripheral controller. The peripheral controller includes a subsampler that receives digital source image data and outputs subsampled image data, and window display circuit. The window display circuit receives a directive from the host computer indicating a window location on the host's display, and the subsampled image data. The window display circuit autonomously (independently of the host CPU) writes the subsampled data through the host's system bus into the display memory at addresses corresponding to the specified window. The apparatus allows video to be displayed on the display screen while avoiding intensive involvement or supervision by the host CPU during display of the video image data.

26 Claims, 6 Drawing Sheets

```
enum Subsample_Mode_t
{
    k_Off,
    k_Halt,             // stop at end of frame
                        // halt subsampling immediately
    k_One_Frame,        // subsample only one frame, then halt
    k_Half_Speed,       // NTSC = 15     PAL = 12.5   frames/sec
    k_Full_Speed        // NTSC = 29.97  PAL = 25     frames/sec
};
struct message_packet {
    unsigned char   length;     // packet length in 32-bit words
    Socket_Number   src;        // source socket number
    Socket_Number   dst;        // destination socket number
    unsigned char   type;       // discriminant for the union
    long            seqNum;     // Sequence number
    union {
        struct packet_window_location {
            long    *address;   // address of top left pixel
            long    row_bytes;  // offset of bytes between rows
            enum Subsample_Mode_t mode : 16;
            short   height;     // nr of rows in subsample image
            short   width;      // nr of pixels in each subsample
        };
        ... other variants of the message packet
    };
};
```

FIG. 8

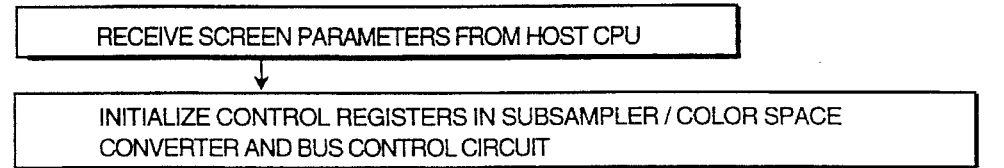
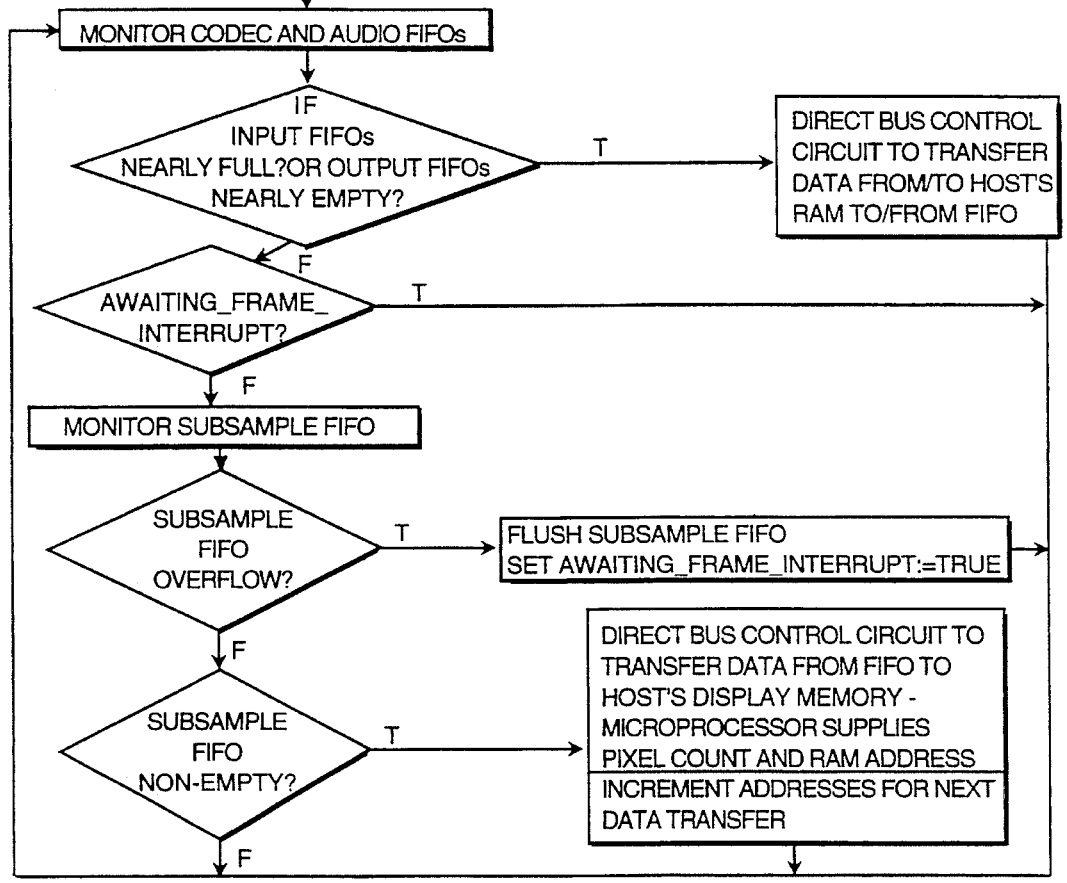
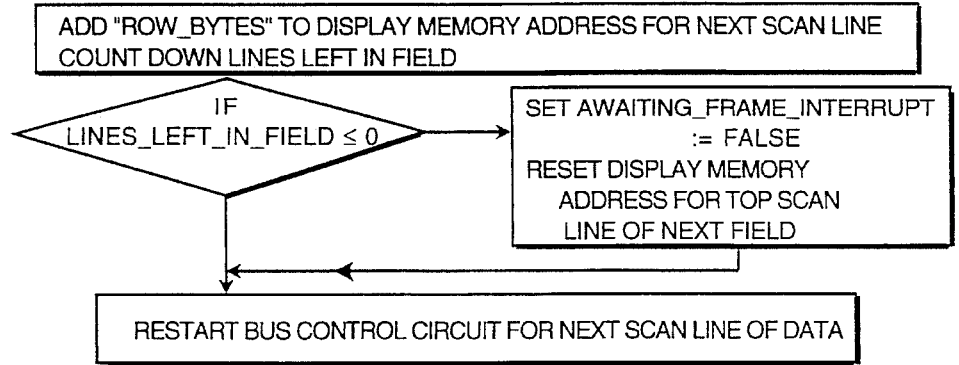
FIG. 9

DISPLAYING A SUBSAMPLED VIDEO IMAGE ON A COMPUTER DISPLAY

This is a continuation of application Ser. No. 08/049,100, filed Apr. 16, 1993, now abandoned.

CROSS REFERENCE TO RELATED APPLICATIONS

Patent applications U.S. Ser. No. 08/048,458, filed Apr. 16, 1993, entitled "Adaptive Video Compression," U.S. Ser. No. 08/048,782, filed Apr. 16, 1993, entitled "Adaptive Video Decompression," U.S. Ser. No. 08/049,987, filed Apr. 16, 1993, entitled "Synchronizing Digital Audio to Digital Video," and U.S. Ser. No. 08/048,490, filed Apr. 16, 1993, entitled "Video Peripheral Board Exercising Bus Master Control Over a System Bus of a Host Computer (As Amended)," filed herewith, are incorporated herein by reference.

BACKGROUND OF THE INVENTION

The invention relates to displaying image data on the display of a computer.

As the costs of high-resolution color computer displays and processing power come down, one of the emerging applications for microcomputers is video post production—displaying and editing video images using the display of the computer as the monitor during the editing process. In a computer video editing system, a video source, typically a video tape recorder, is read and stored in digital form on the disk of a computer. The video may be played back, edited, and written back to a video device.

During the tape-to-disk, editing, and disk-to-tape processes, it is desireable to display the video in real time in a display window so that the user can monitor the operation. Keeping the display updated can pose a large computational demand, easily seen in the sheer data volume of a video program—30 frames per second, over 300,000 pixels per frame, and several bits per pixel.

One method for reducing the computation required for monitoring the video data is called subsampling. In subsampled video, each full frame (640×480 pixels per frame in the NTSC standard form factor used in U.S., 768×576 pixels per frame in the PAL standard used in Europe and Japan) is reduced to a smaller number of pixels, for instance 160×120 pixels, which is then displayed in a window on the display screen, permitting other areas of the display to be used for interactive display and control.

In known video editing systems, the CPU of the host computer had responsibility for keeping the video monitor updated at the same time that it kept up with other concurrent tasks, e.g., executing user commands and supervising other system activities

SUMMARY OF THE INVENTION

The invention features, in general, apparatus for displaying a real-time subsample from a video source onto the display of a host computer by transferring the data to a display controller's memory. In one aspect, the invention features apparatus for displaying a reduced-size image in a window of the display of a host computer, the reduced-size image being based upon subsampled digital image data. The apparatus includes a host computer and a peripheral controller. The peripheral controller includes a subsampler that receives digital source image data and outputs subsampled image data, and window display means. The window display means receives a directive from the host computer indicating a window location on the host's display, and the subsampled image data. The window display means autonomously (independently of the host CPU) writes the subsampled data through the host's system bus into display memory at addresses corresponding to the specified window. The apparatus allows video to be displayed on the display screen while avoiding intensive involvement or supervision by the host CPU during display of the video image data.

Preferred embodiments may include the following features. The subsampler may programmable to display a subsample with a desired size and position. The programming may be under the direction of the host computer. The window display means may include means for de-interlacing scan lines of fields of interlaced image data, for instance by storing successive scan lines of the video data (from each of two fields) into alternating scan lines of the display memory. The apparatus may further comprise a FIFO for storing the subsampled data before the subsampled data are written to the display memory. The apparatus may transfer the subsampled data to the display memory without requiring intervention of the host CPU, or supervision less often than once per frame. The apparatus may comprise a scheduler to temporarily suspend the window display means in order to allow the timely completion of higher priority tasks. The scheduler may monitor the fill levels of the FIFO. The apparatus may further comprise a compression coder or a decompression decoder. The apparatus may further comprise a color space converter. The window display means may block the subsampled image data into blocks for efficient transfer across the system bus into the display memory.

Among the advantages of the invention are the following. A device embodying the invention displays image data, e.g., video data, on the display of a host computer, while reducing the demand for intervention and supervision by the central processor of that host computer. The subsampling and display can be preempted by higher priority tasks in the system.

Other advantages and features of the invention will become apparent from the following description of a preferred embodiment, and from the claims.

DESCRIPTION OF PREFERRED EMBODIMENTS DRAWINGS

FIG. 8 shows the data structure for messages from the host CPU to the peripheral board.

FIG. 9 is flow chart showing the operation of the system.

OVERVIEW

Figure 1:
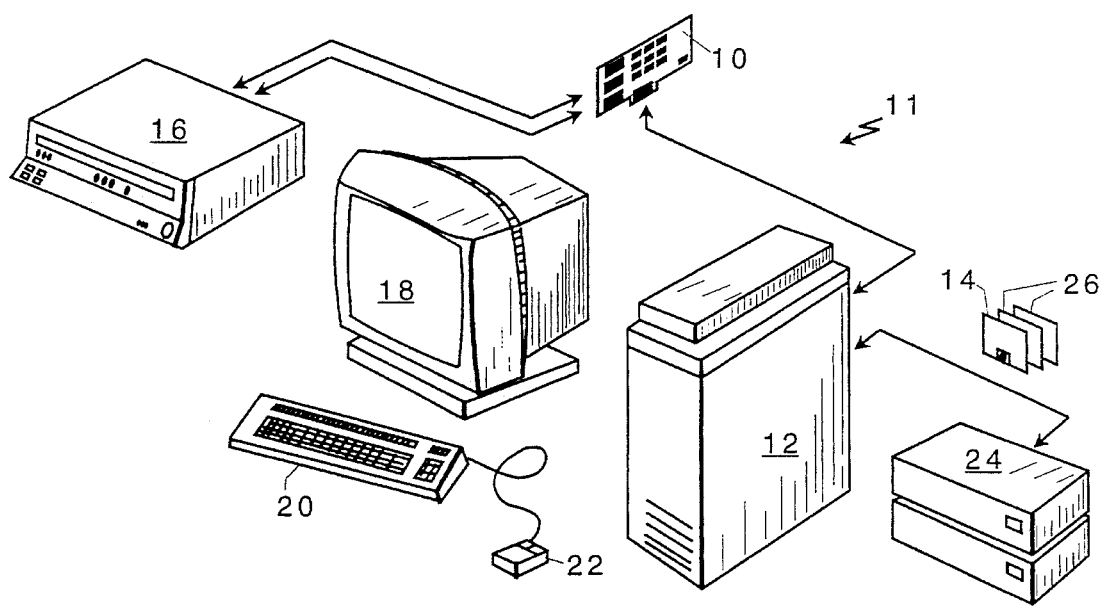
FIG. 1 is a diagrammatic perspective view of components used in a video editing system operating according to the invention.
Figure 2:
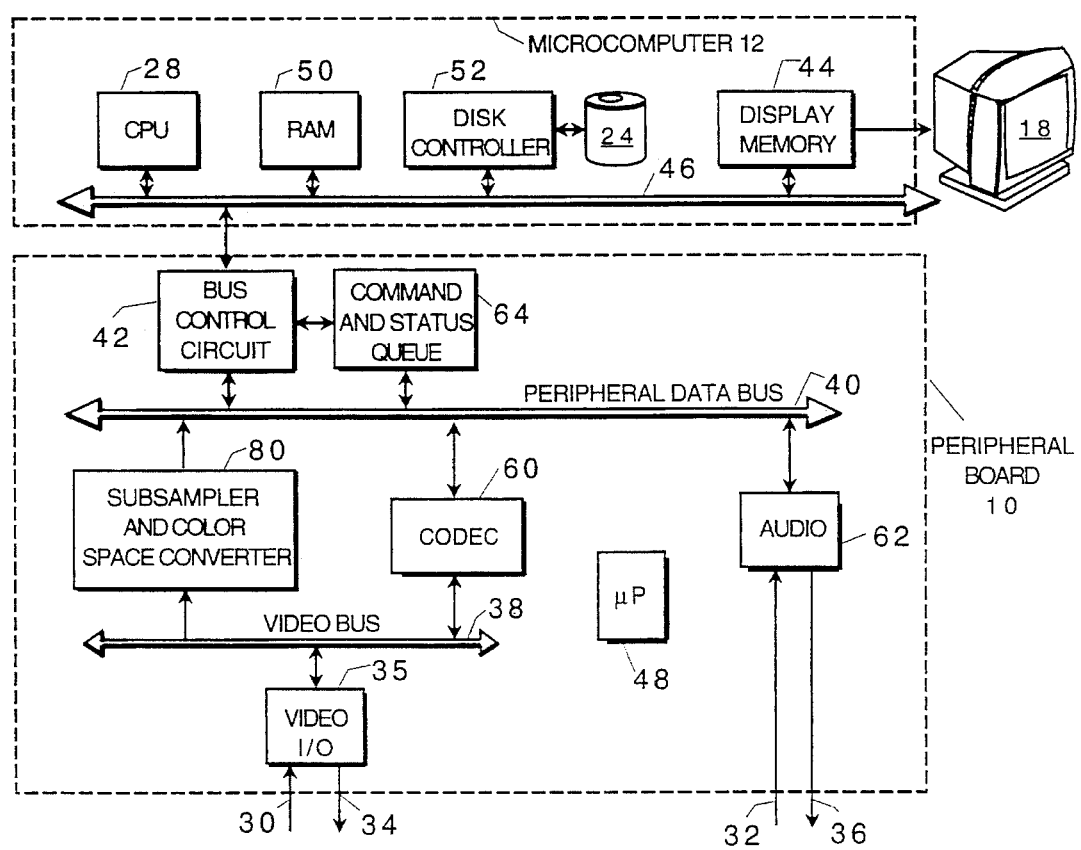
FIG. 2 is a block diagram of a host computer and a video peripheral board used in the system of FIG. 1.

Referring to FIGS. 1 and 2, video editing system 11 includes peripheral board 10 that plugs into host computer 12. Other components include video tape recorder (VTR) 16, monitor 18, keyboard 20, mouse 22, and mass storage disk 24. The software providing video editing functionality is divided into two portions, one portion 26 that executes on the host computer's central processing unit (CPU) 28, generally providing a user interface and supervision, and one portion 14 that executes on the peripheral board, generally controlling the peripheral board, data transfer within the peripheral board, and data transfer between the host computer and the peripheral.

In video editing system 11, video is read through video input port 30, and audio is input through audio input port 32. As they are read, the video is digitized and compressed, and the audio is digitized. The video and audio are stored on the disk 24. The compressed video/audio data may be decompressed and played back onto display 18 and speakers (not shown). Video editing software 26 allows a user to assemble portions of the compressed video and audio into a video/audio program. As the user edits the program, he can play it and rearrange it in small increments, as small as a single frame, or in assembled combination. Once the user is satisfied with the resulting program, it can be output at full frame rates through video output port 34 and audio output port 36 to a video capture device, e.g., VTR 16, or to a broadcast device.

Referring to FIG. 2, the peripheral board has video and audio ports 30–36 (to connect VTR 16 or other video device), bus control circuit 42 (to interface with host computer 12), various signal processing paths, and supervisory microprocessor 48. The paths include a two-way path through a compression/decompression coder/decoder (CODEC) 60 to transfer digitized video to or from host computer disk 24, and a one-way color-space conversion (CSC) and subsample path to display digitized video on host computer display 18. Video I/O port circuit 35 converts the video data from the VTR's analog form, e.g., NTSC or PAL, to a digital form, e.g., YUV 4:2:2 format, and puts the digital video on video bus 38. (Video bus 38 can also be written by CODEC 60 during video decompression.) Tracing the path of a video signal from video bus 38 to the display screen on the subsample path, the YUV data are read from video bus 38, converted to the format required by the display system and subsampled to fit the subsample window of the display at subsampler/CSC 80, and written onto peripheral data bus 40. Bus control circuit 42 writes data to the display memory (also called a "frame buffer") 44 of host computer 12 through system bus 46 of host computer 12. The display system displays the data written into display memory 44. Microprocessor 48 controls the components of the peripheral board.

Figure 3:
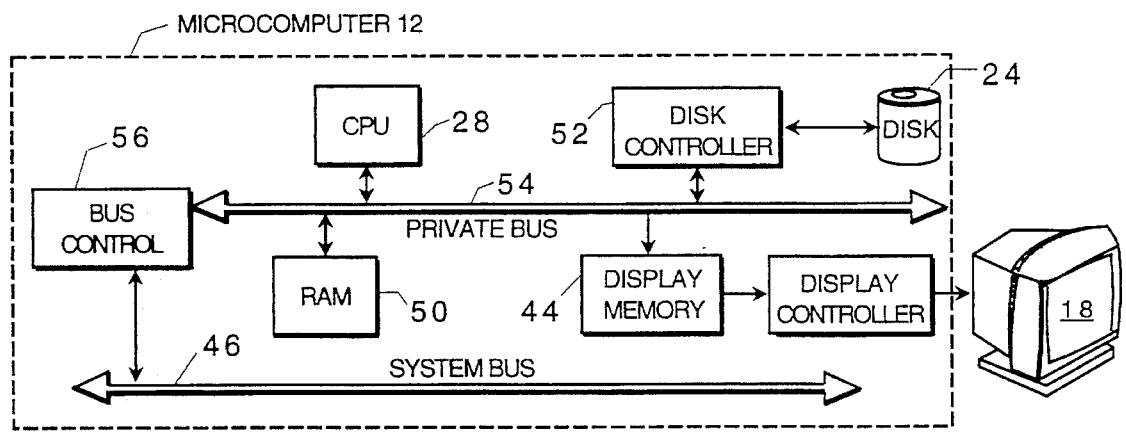
FIG. 3 is a block diagram of an alternate organization of the host computer.

Alternately, as shown in FIG. 3, host computer's CPU 28, display memory 44, main memory 50, and/or disk control 52 components may transfer data through a bus 54 private to host computer 12, with bus control interface 56 between the private bus 54 and system bus 46. In this case, the peripheral's bus control circuit 42 transfers data to/from the system bus 46, and the host's bus control interface 56 further directs the data to/from the devices on the host computer's private bus 54.

Referring again to FIG. 2, peripheral board 10 has a number of alternate paths in addition to the subsample path. For instance, the video data may be read from the video bus 38 by CODEC 60; the encoded data may be read from the peripheral data bus 40 and written to the host computer's main storage 50 for transfer to disk controller 52. An audio channel transfers data from/to the VTR (or other audio source) to/from the peripheral's data bus 46 through an audio controller 62 and an audio I/O ports 3, 36.

Color space conversion is the process of converting from one encoding representing the chrominance and luminance (color and brightness value) of a pixel to another. Most computer color display devices use red/green/blue (RGB) encoding: that is, the display memory 44 has a memory cell corresponding to each pixel of the display screen 18, and this memory cell has three subcomponents representing the brightness intensity of each of red, green, and blue. By varying the numerical value of each of these three subcomponents, the color of the pixel can be varied to produce a specific color, much as any color paint can be mixed from varying proportions of red, yellow, blue, black, and white paint. Any program or device that wants to display a figure on the display must do so by writing red, green, and blue values into the display memory, and must use the RGB encoding predetermined by the manufacturer of the display system. On the other hand, most video processing electronics represent chrominance and luminance by varying the values of a YUV encoding. YUV represents color video information by dividing it into a luminance component Y, and color components U and V. This separation of luminance and chrominance enables more faithful handling of the video signals which results in higher quality final images. The color space conversion of the preferred embodiment converts from YUV encoding on video bus 38 to RGB encoding for storage into display memory 44.

Subsampling is the process of reducing a full-size image to a reduced size image. Full-size video may be reduced to fit an arbitrary-size subsample window, for instance 160× 120 pixels (160×120 is preferred for displaying NTSC video because it is an integer submultiple of the NTSC form factor). Subsampling may be accomplished by any of several methods: several adjoining pixels can be averaged together, or a representative subset of the pixels can be filtered out—for instance, selecting only the odd-numbered pixels of odd-numbered scan lines. Or the two techniques can be combined. For instance, subsampler 80 may only display only every fourth scan line, thereby cutting the number of vertical pixels by ¾. In each horizontal scan line, the subsampler may skip two pixels, then average two, then skip two, then average two, etc. (thereby cutting the number of horizontal pixels by ¾).

Figure 5:
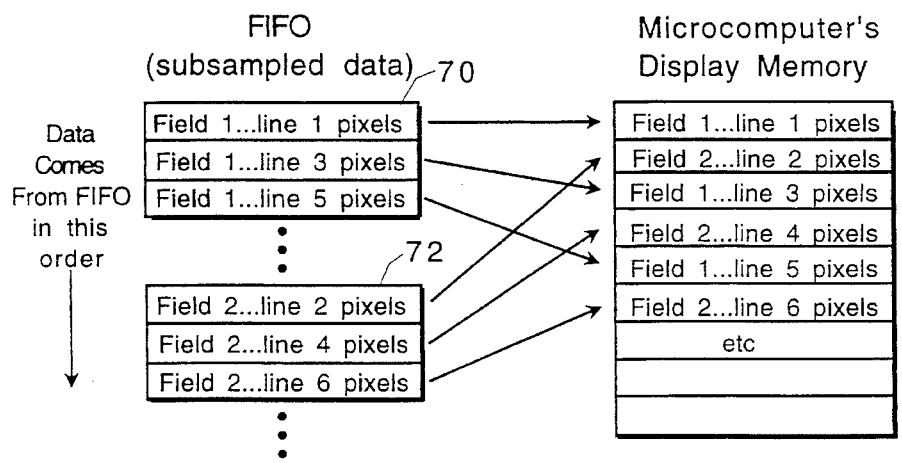
FIG. 5 is a diagram illustrating de-interlacing, an operation performed by the peripheral board of FIG. 2.

Referring to FIG. 5, some video formats, e.g. NTSC, interlace the scan lines of a frame. That is, rather than scanning a frame continuously left-to-right top-to-bottom, a frame is divided into two fields 70, 72. The first field 70 includes all of the odd-numbered scan lines, and the second field 72, transmitted after the entire first field is complete, includes all the even-numbered scan lines. The fields of the assembled frame are scanned alternately.

Figure 4:
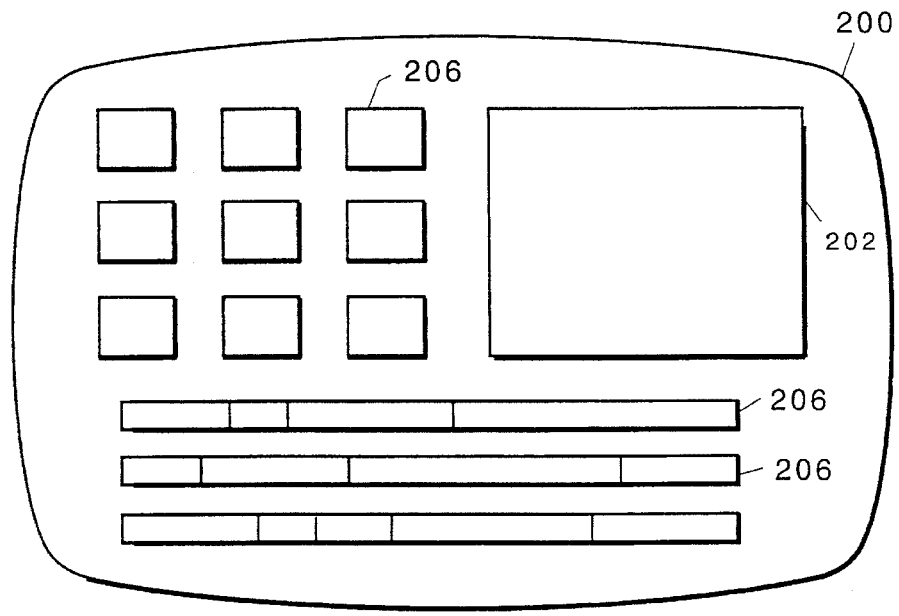
FIG. 4 is a screen display of a video editing session.

Referring to FIG. 4, display screen 200 of the host computer displays, in addition to subsample window 202, FIGS. 206 to allow the user to control the editing session. The control figures may include representative frames from video clips, slide switches control knobs, pointers, etc.

STRUCTURE

Figure 6:
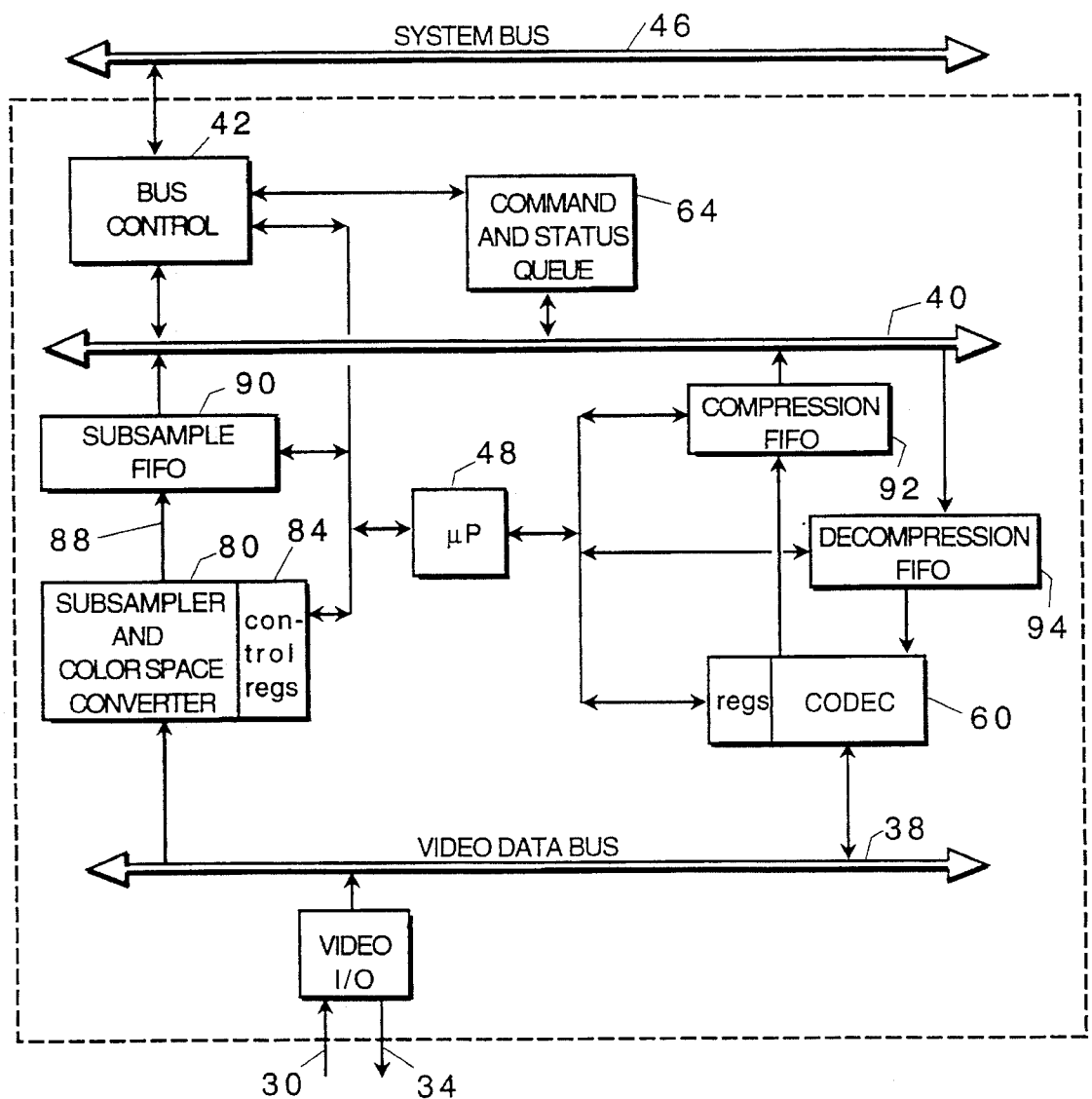
FIG. 6 is a block diagram detailing some of the features of the video peripheral board of FIG. 2.

FIG. 6 shows the subsampling path and the compression/decompression path through the peripheral board 10 in more detail. Video data bus 38 carries video data generated by any of several components, e.g., the video input port or the decoder portion of the CODEC 60. Color space converter and subsampler 80 has control registers 84 that control its operation. These control registers are read and written by peripheral microprocessor 48. The converted, subsampled pixel values 88 are buffered in a subsample FIFO (first-in first-out queueing store) 90. Bus control circuit 42 reads the subsampled video out of FIFO 90 and bundles the pixel values into blocks that can be efficiently transferred to the display memory 44 via the system bus 46. (Either the organization of FIG. 2, in which the display memory is connected to the system bus, or the organization of FIG. 3, where the host has a private bus, is applicable.)

Subsampler and color space converter 80 may be provided together in a single chip, for instance the CL-PX0070 Video Window Generator from Pixel Semiconductor. This part provides conversion from a variety of standard digital video input formats to a variety of RGB encoding outputs; the RGB format chosen will match that required by display system 18 of the host computer. The part has internal control registers 84 that specify color conversion, scaling, pixel resolution processing, and window clipping parameters. Input pins provide the clocking and data for the input video, and read requests for converted pixel output. Output pins provide the converted, subsampled output pixel values and other status information, for instance the state of the chip's internal output FIFO.

Microprocessor 48 controlling the peripheral board 10 is a Motorola MC68030. The components of the peripheral board 10 requiring control include subsample FIFO 90, compression and decompression FIFOs 92, 94, audio FIFOs (not shown), and the various subsampling, color space conversion, and compression components of the peripheral board. A relatively fast microprocessor is chosen to satisfy the latency demands for real-time service.

Subsample FIFO 90 uses 25 ns parts, is 32 bits wide and 16K words deep, with each entry encoding the RGB value of one pixel. 32 bits is wide enough to accommodate the largest common RGB encoding: 8 bits each of red, green, and blue. A 24-bit pixel encoding is padded out to fill a 32bit word.

Video data bus 38 and color space converter and subsampler 80 are constrained to operate at the rate of the video I/O system. But host computer 12, with its responsibility for servicing interrupts from various peripherals and user programs, cannot provide real-time service. FIFOs 90, 92, 94 decouple the real-time operation and requirements of synchronous video data bus 38 from the inherently asynchronous operation of host computer 12 and peripheral data bus 40. The coordination of flow control between the various FIFOs will be discussed below.

Figure 7:
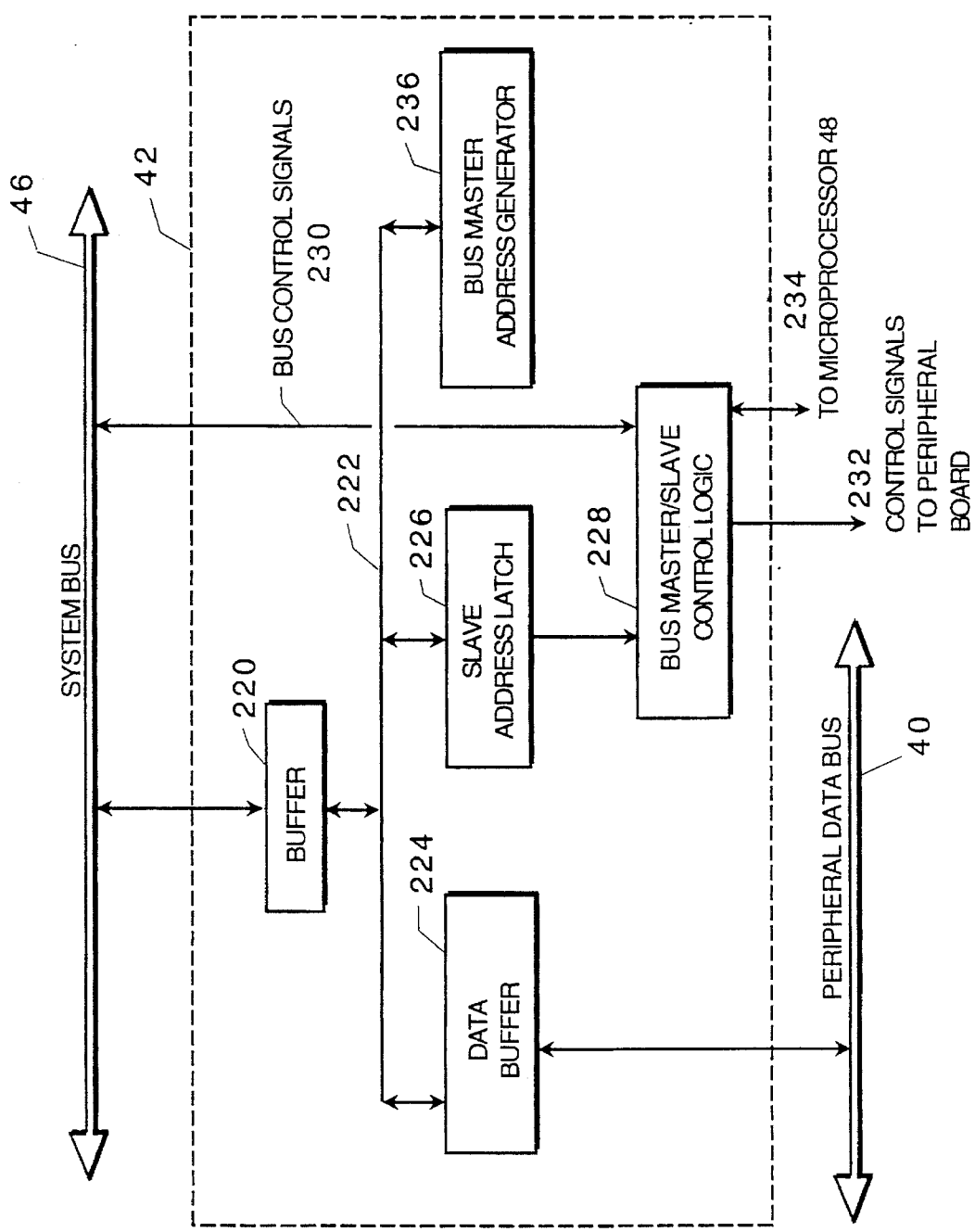
FIG. 7 is a block diagram of the bus control circuit of FIG. 2.

Referring to FIG. 7, bus control circuit 42 interfaces system bus 46 to peripheral board 10. Buffer 220 buffers the bus data and address lines of system bus 46. Data buffer 224 buffers data to be sent to and received from system bus 46, and slave address latch 226 latches the addresses. Peripheral board 10 may act as bus master; when in this mode, bus master address generator 236 (in conjunction with microprocessor 48) generates the addresses for these bus transactions. Bus master/slave control logic 228 generates and receives bus control signals 230 to/from the bus and passes the signals 232, 234 from/to microprocessor 48 and other components of the peripheral board.

Referring again to FIG. 6, as mentioned earlier in connection with FIG. 5, bus control circuit 42, under the supervision of microprocessor 48, unloads the RGB subsampled pixel values from subsample FIFO 90 and writes them over system bus 46 to the proper locations in display memory 44. Horizontal scan lines are in interlaced order through the color-space converter, subsampler, and subsample FIFO; bus control circuit 42 de-interlaces the scan lines as it stores them into the display memory. At the end of a scan line or the end of a field, microprocessor 48 performs the address arithmetic to calculate the correct address in the display memory 44 for the next scan line of pixels. The new scan line's address is calculated so as to de-interlace the fields of a frame by directing each scan line of subsampled data to the correct line in display memory 44. Microprocessor 48 gives this address and the number of pixels in the scan line to bus control circuit 42.

To reduce bus traffic, bus control circuit 42 bundles pixel values up into blocks for efficient bus transfers. The gap between blocks allows other operations, for instance CODEC copy operations, audio channel copy operations, or dynamic RAM refresh cycles, to preempt the stream of subsampled video data. Bus control circuit 42 requests the 32-bit wide data words that encode the pixel values one-by-one from subsample FIFO 90 until it has a bus transfer block, typically 16 32-bit words per block, and then transfers the pixel values in a block. Bus control circuit 42 counts the number of pixels written to each scan line, and may complete the transfer with a "short block" to fill out the end of a scan line. The bus control circuit performs its own address arithmetic to find the address in display memory 44 for each successive block of a scan line. At the end of a scan line, the bus control circuit interrupts microprocessor 48; microprocessor 48 then provides bus control circuit 42 with the next address in display memory 44. Microprocessor 48 does the address arithmetic to de-interlace the scan lines and to move the bus control circuit 42 back to the top of the subsample window at the end of each field.

Once the pixel values are stored in display memory 44, they will be displayed on display 18 until they are overwritten by new values.

The peripheral board may also have a second video output port to which a TV monitor may be attached; this TV monitor will display the video in full format.

The preferred host computer is an Apple Macintosh, model Quadra 950 or faster.

The video editing session is under the control of software 26 that runs on CPU 28 of the host computer. This software provides a graphical user interface to the human user for control of the video editing session, and supervises the operation of peripheral board 10. The supervision required of host CPU 28, however, is limited: CPU 28 provides one message to the peripheral board to begin displaying video in a window at a specified screen position. Future messages may direct the peripheral board to move the video window to a different window of the screen, or to stop the display, but no further messages or computation are required from the Macintosh CPU to simply sustain the video display.

Referring to FIGS. 6 and 8, host CPU 28 controls the peripheral's microprocessor 48 via messages written from host computer to the peripheral's command and status queue 64. The queue occupies a single address on the system bus; to write a multi-word message to the peripheral, the host writes each word to this address in turn. Microprocessor 48 drains these messages from queue 64 and acts on each in turn.

The format for the messages to control the subsampler is shown in the C data structures shown in FIG. 8. "enum Subsample_mode_t" is the stop/start command vocabulary with which the host can control the subsampler. The subsampler can be directed to halt at the next frame boundary or immediately. The subsampler can be directed to subsample and display one frame and halt (k_One_Frame), subsample every frame (k_Full_Speed), or subsample every other frame (k_Half_Speed). The half-speed setting causes the Pixel Semiconductor subsampler part to ignore every other frame. The message packet itself contains a header with a packet length and source and destination addresses. The "type" member discriminates among the variants of the union (the only variant relevant to subsampler operation is shown). The peripheral negates the sequence number when it has processed the packet; this allows the host to correlate reply packets with the packets it issued to the peripheral. The window_location variant of the union specifies the address in the host's display memory for the upper left pixel of the subsample window. The member "row_bytes" tells the address offset between successive scan lines of the display memory. The members "height" and "width" tell the dimensions of the subsample window. The message_packet struct has other members not shown in FIG. 8, for instance those used by the host to manage a pool of message packets in its memory, but these members are not transmitted to the peripheral.

OPERATION

FIG. 9 shows the operation of microprocessor 48.

The system operates as follows. As the host computer is turned on and executes its bootstrap procedure, it queries the display system to find out whether an external display device resides on the system bus (as shown in FIG. 2), or whether the display is on the host private bus (as shown in FIG. 3), and at what addresses the display memory is mapped. The host also queries each of the peripheral boards in the expansion slots, and establishes memory addresses for each of them.

A part of its power-up routine, peripheral board 10 runs a self-test diagnostic (stored in ROM on peripheral board 10) and then waits for software 14 to be downloaded from host computer 12 to microprocessor 48. When video editing software 26 starts on host computer 12, it takes the host out of virtual memory mode so that peripheral 10 will have access to the address space of host 12. Host software 26 then downloads peripheral software 14 to the peripheral board. The downloaded software 14 institutes hand-shaking within peripheral board 10, and then hand-shaking with host CPU 28. When this start-up routine is completed, the peripheral board sets itself into a default mode wherein image data on the video bus are displayed in the window specified by the host, and the peripheral is ready to record or playback video or audio through ports 30–36.

Once the system is in operation, the subsampling path through the peripheral is essentially always active, transforming whatever video data are on video data bus 38 into displayable RGB form, subsampling to a reduced size image, and storing the pixel values in display memory 44. Thus, the user can always monitor the incoming or outgoing video data in the subsample window 202 of the host's display. The color space conversion, subsampling, and writing into FIFO 90 continue synchronously, essentially in real time at the rate of the video device. However, because the subsampling path must compete for system resources—for instance system bus 46—with other paths through the peripheral, bus control circuit 42 transfers data from subsample FIFO 90 to display memory 44 asynchronously. The scheduling interactions of the various paths in resolving these contentions is discussed below.

Note that during the data movement process, host computer CPU 28 is not involved, thus freeing CPU 28 for other tasks. The software 26 running on the host CPU offers the user a number of choices. Typically the user will first load source video data from VTR 16 or another source onto disk 24 so that the video can thereafter be edited. After editing has been completed, the compressed video can be copied from the disk to VTR 16. On user command, the host computer may direct the peripheral to stop the subsampling path, either to freeze a frame or to allow the host computer to reclaim the display memory for other purposes. Host CPU 28 and software 26 also perform system supervisory tasks; for instance, the host can detect faults in peripheral board 10, and can in turn reset peripheral board 10 to clear any incomplete or inconsistent state.

When loading the video onto disk 24, subsampler and color space converter 80 will continue to display whatever image data are on video bus 38. CODEC 60 simultaneously compresses the video data, and bus control circuit 42 transmits the compressed image data to the host's RAM 50, from which the data are copied to disk 24. The peripheral will continue to display whatever image data are presented to video bus 38 by VTR 16.

During editing, the user may view data stored on disk 24 in compressed form. In this case the compressed video data are transmitted from disk 24 through CODEC 60 to video bus 38 and simultaneously pass through subsampler 80 to the display memory 44, all at rates fast enough to permit an image in the window that changes at close to video rates.

The user may direct the system to move or re-size the video window. (Though the hardware is capable of driving any size window up to the full screen of the host display 18 or the full size of the video, the video editing software 26 limits the user's choice of window size and position on the display screen.) The host may specify a window location to the peripheral in a number of ways, for instance by specifying the pixel address of the upper-left corner and a horizontal and vertical size for the window. The host directs the peripheral to halt display of the video image. The user may now move or re-size the video window, for instance by dragging a corner of the subsample window. Once the video window has been dropped, the host computer computes new form factor information for the re-sized window, and directs the peripheral board to commence display of the subsampled video data in the re-sized window. This window size information is stored by peripheral's bus control circuit 42; it will be used to direct the subsampled data stream to display memory 44. The window size/location specification is passed on to the peripheral's microprocessor 48, which in turn computes control values and writes the control values into the subsampler's control registers 84 to direct the subsampler to extract the correct subsample from the full-size video. Microprocessor 48 then primes the subsampler to commence converting and subsampling the video data into the subsample FIFO.

Though the subsample path is always active, other data copying operations, for instance those copying video and audio to/from the VTR from/to the host's disk, may take precedence over the viewing operation: data loss during the tape-to-disk copying operation is effectively irreversible and should be prevented if at all possible. On the other hand, allowing the subsample path to lag the CODEC path—or omitting frames from the video display—is a failure with no lasting impact. The peripheral's microprocessor 48 is responsible for maintaining the integrity of the copy stream by enforcing this priority. To this end, microprocessor 48 controls the rate at which FIFOs 90, 92, 94 are unloaded, up to the saturation rate of system bus 46 of the host computer. Thus, the system can selectively choose the rate at which the video data are sent to the display memory, thereby changing the frame rate of the subsampled video presented on the display. This flow control is effected by the peripheral microprocessor 48: it monitors the fill level of the CODEC's FIFOs 92, 94, FIFOs on the audio path, and subsample FIFO 90, and uses this information to control the peripheral's bus transactions. For instance, if either of CODEC FIFOs 92, 94 is approaching full, microprocessor 48 suspends the bus control circuit's draining the subsample FIFO 90 and gives immediate attention to draining CODEC FIFOs 92, 94. In practice, the subsample window is updated nearly in real time (i.e., at near the video rate), with delays limited to two to four frames.

Referring to the central loop shown in FIG. 9, the peripheral's microprocessor 48 monitors the FIFOs and directs data transfers. Microprocessor 48 allows the FIFOs to fill sufficiently to efficiently transfer data in blocks, before signalling the bus control circuit 42 to begin data transfer. Once microprocessor 48 commands bus control circuit 42 to begin a transfer, it blocks the data from subsample FIFO 90 into blocks of 16 32-bit-wide words for transfer across system bus 46. The blocking logic of bus control circuit 42 is not shown in FIG. 9.

The result of the parallelism between microprocessor 48, subsample FIFO 90, bus control circuit 42, and host CPU 28 is that the display stream is completely asynchronous—the display in the subsample window will often be split between showing parts of two frames for a fraction of a second, usually a time too short to be distinguished by the human eye. During times when the CODEC stream is very full, for instance immediately after a scene change from easy-to-compress material to hard-to-compress material (for instance to a new scene with many more sharp edges), bus control circuit 42 suspends unloading subsample FIFO 90 for several frames until the data volume over the copy stream subsides. Subsample FIFO 90 may overflow during this time. The peripheral's microprocessor 48 will then flush subsample FIFO 90, wait for the next frame or field boundary, and then restart the subsample video stream.

Other embodiments of the invention are within the scope of the claims.

What is claimed is:

1. Apparatus for displaying a reduced-size video image in a window of a display of a host computer, the image being based upon subsampled digital image data, the host computer including a central processing unit (CPU), a display, a display memory connected to said display, and a system bus connected to said central processing unit and said display memory, said apparatus comprising:

a peripheral controller including a subsampler that receives video digital source image data for an image that is changing in real time and outputs subsampled video image data that changes in real time, and window display means for receiving said subsampled video image data and a directive from said host computer indicating the location on said display for said window and for thereafter autonomously writing blocks of said subsampled data through said system bus into said display memory at addresses corresponding to said window such that said window displays active, real time video, said writing of said blocks being carried out independently of said host CPU.

2. The apparatus of claim 1 wherein said subsampler is programmable to extract a subsampled subset of said digital image data such that the subsampled image data create an image in said window on said display having a desired image size.

3. The apparatus of claim 2 wherein said programming of the image size of said window is under the direction of said host computer.

4. The apparatus of claim 1 wherein said digital source image data are in an interlaced form, and said window display means comprises de-interlacing means for de-interlacing scan lines of fields of interlaced image data.

5. The apparatus of claim 4 wherein said display memory comprises memory cells at a plurality of addresses, and said de-interlacing means comprises address generation means for generating addresses in said display memory, said generated display memory addresses being partitioned into sequential groups corresponding to said scan lines, and ordered to effect said de-interlacing of said interlaced scan lines.

6. The apparatus of claim 4 wherein said subsampler outputs said subsampled image data in an interlaced order, and the apparatus further comprises a queuing store in which said interlaced subsampled image data are stored, two fields of a frame being stored in said store in sequence, each field having alternate scan lines of the image, and said de-interlacing means comprises a de-interlacer for unloading said interlaced subsampled image data from said queuing store and storing successive scan lines of said subsampled image data of one field in said queuing store into every other scan line of said display memory and storing successive scan lines of said subsampled image data of the other field in said queuing store between lines of said one field at every other scan line.

7. The apparatus of claim 1 further comprising a FIFO for storing said subsampled data before said subsampled data are written to said display memory.

8. The apparatus of claim 1 wherein said window display means comprises control means to establish a screen location and size of said window and memory locations in said display memory corresponding to said screen location, and means to transfer said subsampled data to said display memory without requiring intervention of said host CPU.

9. The apparatus of claim 1 wherein said subsampler is part of one data transfer path of said peripheral controller, said peripheral controller further comprises other data transfer paths for other data having associated priorities for data transfer, said window display means is implemented by a bus control circuit that is connected to said system bus, said one data transfer path, and said other data transfer paths, said subsampled data has a priority associated with it, and said peripheral controller further comprises a priority scheduler to temporarily suspend said window display means in order to allow the timely completion of transfer of data of priority higher than said subsampled data.

10. The apparatus of claim 9 wherein at least some said data transfer paths comprise FIFOs for temporarily storing data on those paths, each said FIFO having monitoring means for determining the amount of data in said FIFO, and said priority scheduler is responsive to the amount of data determined by said monitoring means to suspend said window display means.

11. The apparatus of claim 9 further comprising means for restarting said window display means when said higher-priority transfer is complete, said restarting being effected without the supervision of said host CPU.

12. The apparatus of claim 9 wherein said other data transfer paths comprise a compression coder or a decompression decoder.

13. The apparatus of claim 1 further comprising window specification means that receives from an application program running on said host computer a screen location and image size of said window, and controls said window display means to write said subsampled data into said display memory at memory locations corresponding to the screen location of said window so that said image data can thereafter be transferred to said host display memory without requiring the involvement or intervention of the host CPU.

14. The apparatus of claim 13 wherein said window specification means comprises means for re-sizing said window or re-positioning said window at another screen location as specified by a user of said host computer to result in a resized or repositioned window on said screen, and for controlling said window display means to write said subsampled data into said display memory at memory locations corresponding to said re-sized or re-positioned window on said screen.

15. The apparatus of claim 1 wherein said source image data are grouped in frames, each frame including the data for an image in said window, and said subsampled image data are displayed on said display with intervention required from the host processor less often than once per frame.

16. The apparatus of claim 1 wherein said display memory has a predetermined protocol for representing the color and brightness value of a pixel on the display, and said peripheral controller further comprises a color space converter for converting said digital image data to image data in said predetermined protocol required by the display.

17. The apparatus of claim 16 wherein said converter converts said digital source image data to said predetermined protocol before said subsampler subsamples said image data.

18. The apparatus of claim 1 wherein said host computer is a personal computer, and said peripheral controller is configured as one board to plug into one expansion slot of said personal computer or as a plurality of boards to plug into a plurality of expansion slots of said personal computer.

19. The apparatus of claim 1 wherein said CPU and said display memory of said host computer are connected by a private bus, and said peripheral controller is connected to said display memory through both said system bus and said private bus.

20. The apparatus of claim 1 wherein said CPU, display memory, and peripheral controller are connected directly to said system bus.

21. The apparatus of claim 1 wherein said window display means blocks said subsampled image data into blocks for efficient transfer across said system bus into said display memory.

22. Apparatus for displaying digital video image data for an image that is changing in real time on the display of a host computer, the display having a memory-mapped display memory with a predetermined protocol for representing the color and brightness value of a pixel on the display, the apparatus comprising:

a peripheral processor that receives a directive from the host processor indicating a target display area of the host's display and thereafter autonomously takes as input blocks of said digital video image data and stores them into memory cells of the display memory corresponding to said target display area, said digital video image data being grouped in frames, each frame including the data for an image in said target display area;

wherein the peripheral processor decodes the digital image data from one encoding to the predetermined protocol required by the display before storing said digital video image data in said display memory;

such that active real-time video is displayed on the host's display with intervention required from the host processor less often than once per frame.

23. The apparatus of claim 22 wherein said decoding comprises color space conversion.

24. The apparatus of claim 22 wherein said decoding comprises de-interlacing.

25. The apparatus of claim 22 further comprising a FIFO for storing said decoded image data before said decoded image data are stored into said target display area.

26. A method for displaying a reduced-size video image in a window of a display of a host computer, the reduced-size image displaying subsampled digital image data for an image that is changing in real time, the host computer including a central processing unit (CPU), a display, a display memory connected to said display, and a system bus connected to said central processing unit and said display memory, the method comprising the steps of:

issuing a command from said host CPU to a peripheral controller, said command indicating the location on said display for said window; and thereafter receiving blocks of source image data for an image that is changing in real time at said peripheral controller, and autonomously subsampling said image data to result in subsampled data and writing said subsampled data through said system bus into said display memory at addresses corresponding to said window, said receiving, subsampling, and writing being carried out without intervention by said host CPU.

* * * * *